United States Patent
Watanabe et al.

(10) Patent No.: US 9,025,509 B2
(45) Date of Patent: May 5, 2015

(54) MOBILE WIRELESS COMMUNICATION SYSTEM, ACCESS GATEWAY, WIRELESS BASE STATION, AND MOBILE WIRELESS COMMUNICATION CONTROL METHOD

(71) Applicant: Fujitsu Limited, Kawasaki-shi, Kanagawa (JP)

(72) Inventors: Teruyoshi Watanabe, Kawasaki (JP); Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 13/646,083

(22) Filed: Oct. 5, 2012

(65) Prior Publication Data
US 2013/0028166 A1    Jan. 31, 2013

Related U.S. Application Data

(62) Division of application No. 11/790,579, filed on Apr. 26, 2007, now Pat. No. 8,310,972.

(30) Foreign Application Priority Data

Oct. 6, 2006   (JP) .................................. 2006-275259

(51) Int. Cl.
  *H04W 4/06*   (2009.01)
  *H04J 3/24*   (2006.01)
  *H04W 72/00*  (2009.01)

(52) U.S. Cl.
  CPC .................................. *H04W 72/005* (2013.01)

(58) Field of Classification Search
  CPC .................................. H04W 4/06; H04J 3/24
  USPC ............................ 370/312, 349; 455/436, 442
  See application file for complete search history.

(56) References Cited

U.S. PATENT DOCUMENTS 6,493,539 B1   12/2002   Falco et al.
2004/0008646 A1   1/2004   Park et al.
(Continued)

FOREIGN PATENT DOCUMENTS

CN   1522079 A   8/2004
JP   09261154   10/1997
(Continued)

OTHER PUBLICATIONS

3GPP TR25.814 v7.0.0; (Jun. 2006); 3rd Generation Partnership Project; Technical Specification Group Radio Access Network; Physical layer aspects for evolved Universal Terrestrial Radio Access (UTRA), Chap. 7.1.1 Basic transmission scheme, p. 20-34.
(Continued)

*Primary Examiner* — Myron K Wyche
(74) *Attorney, Agent, or Firm* — Smith, Gambrell & Russell, LLP (57) ABSTRACT

The present invention discloses a wireless mobile communication system for transferring MBMS data from an access gateway to plural wireless base stations and transmitting the MBMS data from the plural wireless base stations to a wireless mobile station at the same time. The system includes a transferring part included in the access gateway for copying the MBMS data in a number corresponding to the number of the plural wireless base stations, adding a header indicative of data transmission time to the MBMS data, and transferring the MBMS data to the plural wireless base stations; a transmitting part included in each the plural wireless base stations for extracting the data transmission time from the header of the transferred MBMS data, deleting the header from the MBMS data, and transmitting the MBMS data to the wireless mobile station.

1 Claim, 6 Drawing Sheets

(56) References Cited

U.S. PATENT DOCUMENTS

| | | | |
|---|---|---|---|
| 2004/0014482 | A1 | 1/2004 | Kwak et al. |
| 2004/0022218 | A1 | 2/2004 | Kim et al. |
| 2004/0151157 | A1* | 8/2004 | Nishimura et al. ........... 370/349 |
| 2005/0094618 | A1 | 5/2005 | Colban et al. |
| 2005/0201407 | A1 | 9/2005 | Kim et al. |
| 2005/0270996 | A1* | 12/2005 | Yi et al. .................. 370/312 |
| 2006/0013168 | A1 | 1/2006 | Agrawal et al. |
| 2007/0291674 | A1 | 12/2007 | Cheng et al. |
| 2008/0108364 | A1 | 5/2008 | Nishimura et al. |
| 2009/0285144 | A1 | 11/2009 | Motegi et al. |

FOREIGN PATENT DOCUMENTS

| | | | |
|---|---|---|---|
| JP | 2000041021 | | 2/2000 |
| JP | 200169559 | | 3/2001 |
| JP | 2002335556 | | 11/2002 |
| JP | 2003348643 | | 12/2003 |
| JP | 2004229117 | A | 8/2004 |
| JP | 2005065335 | | 3/2005 |
| JP | 2005323113 | | 11/2005 |

OTHER PUBLICATIONS

Decision to Dismiss Amendment Office Action dated Jun. 12, 2012 received in Japanese Patent Application No. 2006-275259.

First Notification of Office Action issued in CN 200710107493.9 dated Jan. 22, 2010.

3rd Generation Partnership Project; Technical Specification Group Radio Access Network; Feasibility study for evolved Universal Terrestrial Radio Access (UTRA) (Jun. 2006), 3GPP TR 25.912 V7.0.0, XP-002416231, pp. 1-57.

Extended European Search Report dated Jul. 26, 2007, Application No. 07106741.7-1244.

Non-Final Office Action dated Dec. 11, 2009 received in U.S. Appl. No. 11/790,579.

Final Office Action dated Jun. 10, 2010 received in U.S. Appl. No. 11/790,579.

Non-Final Office Action dated Dec. 6, 2011 received in U.S. Appl. No. 11/790,579.

Notice of Allowance dated Jul. 6, 2012 received in U.S. Appl. No. 11/790,579.

* cited by examiner

MOBILE WIRELESS COMMUNICATION SYSTEM, ACCESS GATEWAY, WIRELESS BASE STATION, AND MOBILE WIRELESS COMMUNICATION CONTROL METHOD

BACKGROUND OF THE INVENTION

1. Field of the Invention

The present invention generally relates to a mobile wireless communication system, an access gateway, a wireless base station, and a mobile wireless control method.

2. Description of the Related Art

Currently, various wireless communication systems, which include plural wireless base stations connecting with upper access gateways via a network and plural mobile stations communicating on the move or in a stationary state via the wireless base stations, are proposed and put to practical use. One example is a next generation mobile wireless communication system referred to as the LTE (Long Term Evolution) system. The LTE system includes a MEMS (Multimedia Broadcast Multicast Service) which defines a multicast service and a broadcast service for providing the same data to plural mobile wireless stations located at a predetermined area. The multicast service is for providing services to users that have registered and joined a predetermined multicast service. The broadcast service is for providing services to all users located in a predetermined service area. In the broadcast service, the user can decide whether to receive the data of the service and requires no exchange control signals with respect to the network side (See, for example, 3GPP TR25.814 v7.0.0 (2006-06) (3rd Generation Partnership Project; Technical Specification Group Radio Access Network; Physical layer aspects for evolved Universal Terrestrial Radio Access (UTRA) 7.1.1 Basic transmission scheme).

As another mobile wireless communication system providing a multicast service and a broadcast service, there is proposed a system including a wireless base station(s) and an upper control station(s). This system employs logic channels including MTCH (MEMS point-to-multipoint Traffic Channel) for transmitting data and MCCH (MBMS point-to-multipoint Control Channel) for transmitting control data and a physical channel including MICH (MBMS Notification Indicator Channel) for notifying stations whether control data are being transmitted. In this system, the control station is able to change the time for repetitively transmitting the same control data and sends data indicating the timing of the transmission to the wireless base station. Accordingly, the wireless base station can be notified of the timing change, wherein the timing corresponds to a value no less than a value obtained by adding the difference between a first count value of a counter of the control station and a second count value of a counter of the wireless base station to the first count value.

In operating with the above-described MBMS (MBMS (Multimedia Broadcast Multicast Service), it is necessary for plural wireless base stations to transmit the same data at the same timing to one or more wireless mobile stations. In other words, in a case where plural wireless base stations cannot transmit the same data at the same timing, the wireless mobile station cannot attain continuity of data before and after the handover process. Therefore, the plural wireless base stations are to be synchronized with each other. In the above-described Non-patent document 1, the range of guard-interval (Cyclic Prefix: CP) is defined as a Long CP (Cyclic Prefix) Length of 16.67 μsec. That is, in a case of synchronizing among the plural wireless base stations, a precision of a μ sec order is required. In order to maintain such time precision, a high precision oscillator is to be provided in each wireless base station. Furthermore, in operating the MBMS, it is necessary for an access gateway to transmit the same message to each wireless base station and for each the wireless base stations to transmit data to the wireless mobile station at the same time while still maintaining such time precision.

SUMMARY OF THE INVENTION

The present invention may provide a mobile wireless communication system, an access gateway, a wireless base station, and a mobile wireless control method that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a mobile wireless communication system, an access gateway, a wireless base station, and a mobile wireless control method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a wireless mobile communication system for transferring MBMS data from an access gateway to a plurality of wireless base stations and transmitting the MBMS data from the plural wireless base stations to a wireless mobile station at the same time, the system including: a transferring part included in the access gateway for copying the MBMS data in a number corresponding to the number of the plural wireless base stations, adding a header indicative of data transmission time to the MBMS data, and transferring the MBMS data to the plural wireless base stations; a transmitting part included in each of the plural wireless base stations for extracting the data transmission time from the header of the transferred MBMS data, deleting the header from the MBMS data, and transmitting the MBMS data to the wireless mobile station.

Furthermore, another embodiment of the present invention provides an access gateway for transferring MBMS data to a plurality of wireless base stations, the access gateway including: a gateway interface part for receiving the MBMS data from an upper layer apparatus; a header process part for calculating the time for transmitting data from the plural wireless base stations to a wireless mobile station, setting the calculated data transmission time into a header, and adding the header to the MBMS data; and a transmission path interface part for transferring the MBMS data to the plural wireless base stations.

Furthermore, another embodiment of the present invention provides a wireless base station for transmitting MBMS data transferred from an access gateway to a wireless mobile station, the wireless base station including: a transmitting part for receiving the MBMS data having a header set with data transmission time indicative of the time for transmitting the MBMS data to the wireless mobile station, extracting the data transmission time from the header of the MBMS data, deleting the header from the MBMS data, and transmitting the MBMS data to the wireless mobile station.

Furthermore, another embodiment of the present invention provides a wireless mobile communication control method for transferring MBMS data from an access gateway to a plurality of wireless base stations and transmitting the MBMS data from the plural wireless base stations to a wireless mobile station at the same time, the method including the steps of: a) copying the MBMS data in a number corresponding to the number of the plural wireless base stations; b) adding a header indicative of data transmission time to the MBMS data; c) transferring the MBMS data from the access gateway to the plural wireless base stations; d) extracting the data transmission time from the header of the transferred MBMS data; e) deleting the header from the MBMS data; and f) transmitting the MBMS data to the wireless mobile station.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Figure 1A:
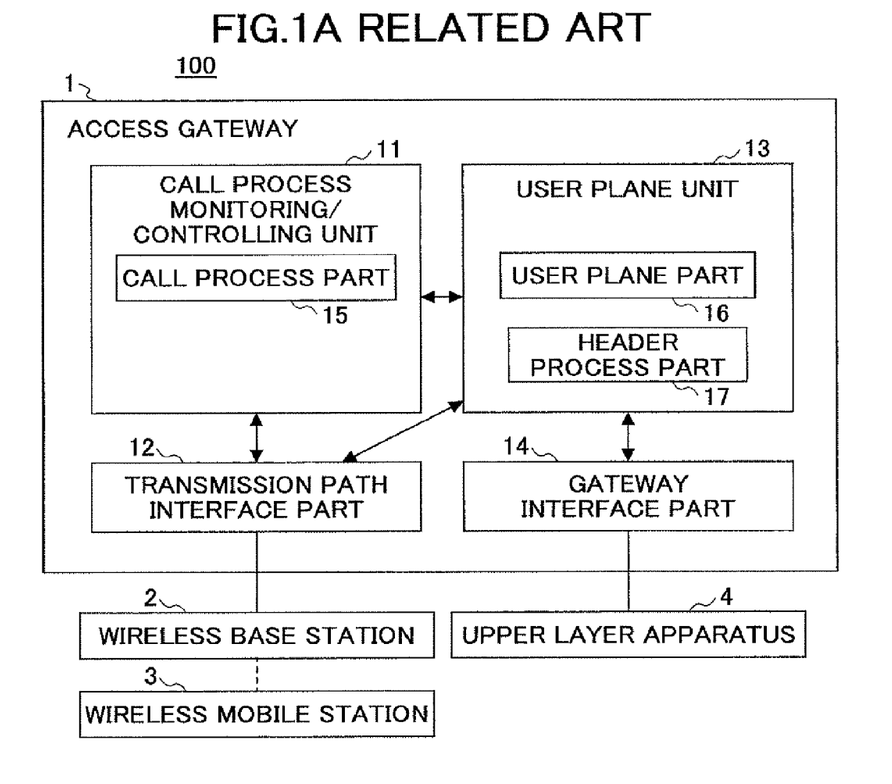
FIGS. 1A and 1B are schematic diagrams for describing a configuration of a mobile wireless communication system 100 according to an embodiment of the present invention.
Figure 1B:
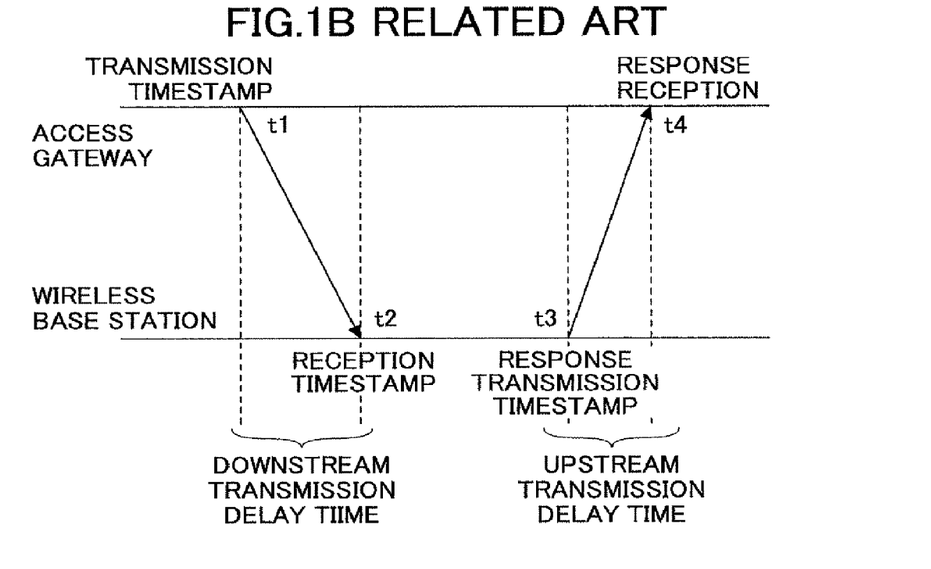

FIGS. 1A and 1B are schematic diagrams for describing a configuration of a mobile wireless communication system 100 according to an embodiment of the present invention. More specifically, FIG. 1A is for mainly showing functional parts of an access gateway. FIG. 1B is for describing transmission delay time between an access gateway and a wireless base station. In FIG. 1, reference numeral 100 indicates a mobile wireless communication system, reference numeral 1 indicates an access gateway, reference numeral 2 indicates a wireless base station, reference numeral 3 indicates a wireless mobile station, reference numeral 4 indicates an upper layer apparatus, reference numeral 11 indicates a call process monitoring/controlling unit, reference numeral 12 indicates a transmission path interface part, reference numeral 13 indicates a user plane unit, reference numeral 14 indicates a gateway interface part, reference numeral 15 indicates a call process part, reference numeral 16 indicates a user plane part, and reference numeral 17 indicates a header process part according to an embodiment of the present invention.

Although FIG. 1A shows an example where the access gateway 1 is connected (in this example, by wireless connection) to a single wireless base station 2, a single wireless mobile station 3 connected to the wireless base station 2, and a single upper layer apparatus 4 via a network (not shown), the access gateway 1 may be connected (in this example, by wireless connection) to plural wireless base stations 2, plural wireless mobile stations 3, and plural upper layer apparatuses 4. Although various configurations may be applied to the configuration of the access gateway 1, the wireless base station 2, the wireless mobile station 3, and the upper layer apparatus 4, the access gateway 1 according to an embodiment of the present invention has the header process part 17 included in its user plane unit 13. In a case where data received from the upper layer apparatus 4 via the gateway interface part 14 are to be transmitted as MEMS data (i.e., data used for MBMS), the header process part 17 generates a header (header data) which is set with transmission time data indicating the time in which the MBMS data are to be transmitted by the wireless base station 2. Then, the header process part 17 attaches the generated header to the MBMS data and transmits the MBMS data to the wireless base station 2 via the transmission path interface part 12. Furthermore, the call process monitoring/controlling unit 11 is for controlling the call process to the wireless mobile station 3 via the wireless base station 2. Furthermore, the user plane unit 13 is for managing and controlling data communications (transmission/reception) with the wireless mobile station 3 via the wireless base station 2.

The transmission time data, which are set in the header of the MBMS data to be transmitted to the wireless base station 2, can be calculated in the user plane part 13 of the access gateway 1. In the calculation, downstream transmission delay time is expressed as "$\Delta td = t2 - t1$" and upstream transmission delay time is expressed as "0 to $= t4 - t3$" wherein "t1" indicates the time when the access gateway 1 transmits downstream data to the wireless base station 2 (transmission timestamp), "t2" indicates the time when the wireless base station 2 receives the downstream data from the access gateway 1 (reception timestamp), "t3" indicates the time when the wireless base station 2 transmits upstream data to the access gateway 1 (response transmission timestamp, and "t4" indicates the time when the access gateway 1 receives the upstream data (reception of response). According to the above-expressions, the time for each wireless base station 2 to transmit data to the wireless mobile station 3 (indicated as time "ts") is to satisfy a relationship of "$ts > t1 + \Delta td$". By satisfying this relationship, each wireless base station 2 can transmit MBMS data to the wireless mobile station 3 at the same time. Accordingly, the wireless mobile station 3 can continuously receive MBMS data even where the wireless mobile station 3 moves between adjacent wireless base stations 2.

At the time when the wireless base station 2 receives a header indicative of data transmission time (designated data transmission time, indicated as "td") from the access gateway 1, there are may be cases where the data transmission time indicated in the header has already passed the current time (time of receiving the data added to the header). This may occur, for example, during an initial period immediately after system activation or during operation. In such cases, the wireless base station 2 calculates the time difference between the current time and the designated data transmission time (indicated as "te") and reports a data transmission time error to the access gateway 1. The access gateway 1 corrects the designated data transmission time td. That is, the access gateway corrects the designated data transmission time td so as to satisfy a relationship of "$ts > t1 + \Delta td + te$". The corrected transmission time td is then reported to the wireless base station 2.

Since each wireless base station 2 transmits MBMS data from the access gateway 1 at the designated data transmission time, the data transmission times set in each wireless base station 2 and the access gateway 1 are to be synchronized. The synchronization may be attained by using, for example, GPS (Global Positioning System) or radio-waves for radio-wave clocks. Furthermore, the synchronization may be attained by having the access gateway 1 report time data (data indicating its current time) using a count value of its counter (e.g. by adding the time data to the header) to each wireless base station 2 so that each wireless base station 2 can correct the count value of its counter in accordance with the time data difference (transmission delay time) with respect to the access gateway 1. Furthermore, transmission time data may be used as a count value and added to the header.

Figure 2:
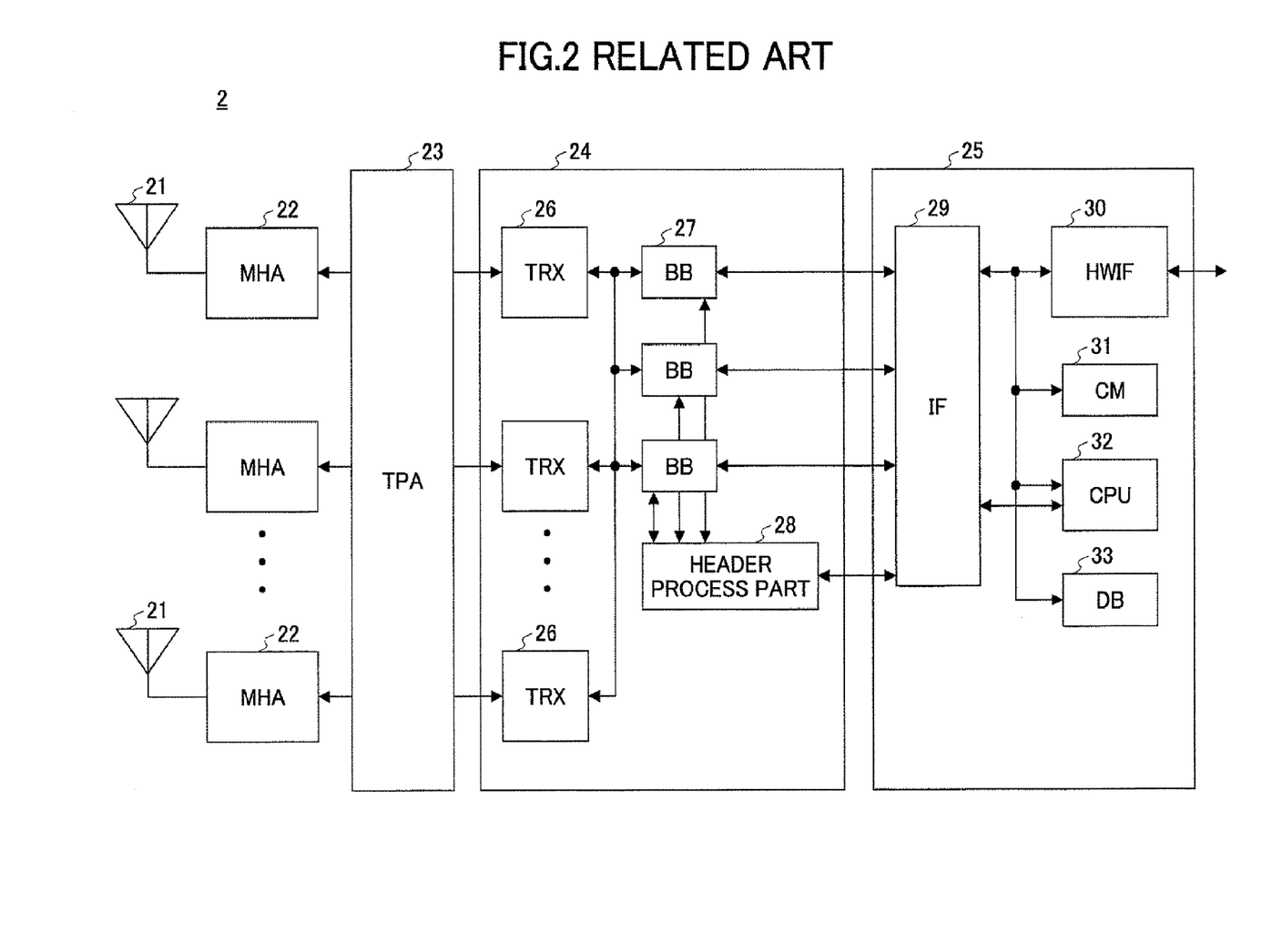
FIG. 2 is a schematic view showing a wireless base station according to an embodiment of the present invention.

FIG. 2 is a schematic view of the wireless base station 2 according to an embodiment of the present invention. In FIG. 2, reference numeral 21 indicates an antenna for communicating (transmission/reception) with the wireless mobile station 3 (not shown), reference numeral 22 indicates a preamplifier (MHA, MastHead Amplifier), reference numeral 23 indicates a power amplifier (TPA, Transmit Power Amplifier), reference numeral 24 indicates a transmission/reception control part, reference numeral 25 indicates a control process part, reference numeral 26 indicates a transmission/reception part (TRX, Transmitter Receiver), reference numeral 27 indicates a base band part (BB, Base Band Unit), reference numeral 28 indicates a header process part, reference numeral 29 indicates an interface part (IF), reference numeral 30 indicates a highway interface part (HWIF, HighWay InterFace) for communicating (transmission/reception) with the access gateway 1 (not shown) via a network (not shown), reference numeral 31 indicates a common memory (CM, Common Memory), reference numeral 32 indicates a call control processor (CPU, Call Processing Unit), and reference numeral 33 indicates a database (DB, DataBase Unit). It is to be noted that FIG. 2 is for schematically illustrating a transmission/reception function of the wireless base station 2 with respect to the wireless mobile station 3.

When the highway interface part 30 of the control process part 25 receives MBMS data added with a header from the access gateway 1, the call control processor 32 controls data transfer so that the MBMS data are transferred from the interface part 29 to the base band process part 27 of the transmission/reception control part 24 and the header added to the MBMS data is transferred to the header process part 28. The header process part 28 selects the time for transmitting the MBMS data to the wireless mobile station 3 according to the designated data transmission time set in the header. In a case where the current time is passed the designated data transmission time, the wireless base station reports a data transmission time error to the access gateway 1 via the highway interface part 30.

Figure 3:
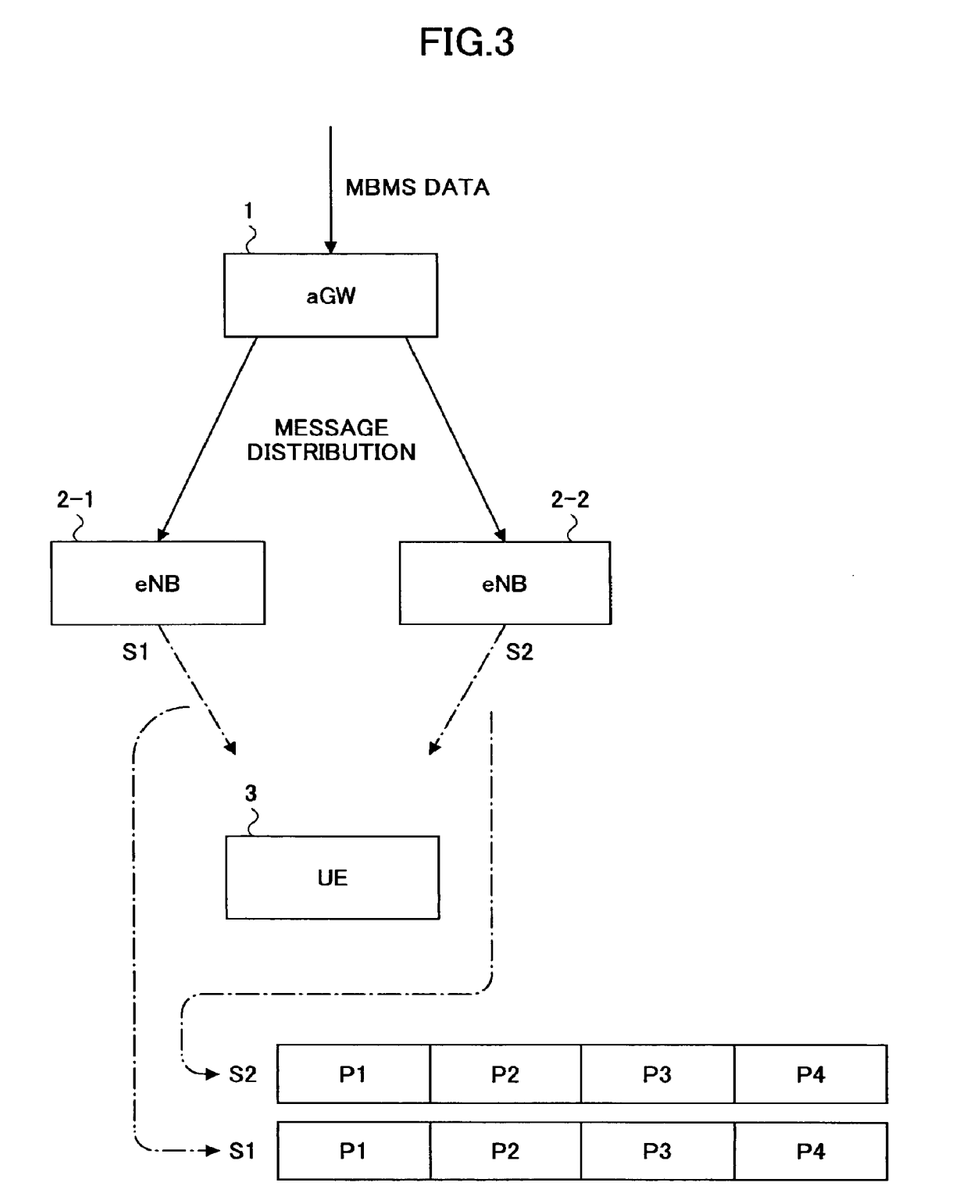
FIG. 3 is a schematic diagram showing MBMS data transmitted through an access gateway, a wireless base stations and a wireless mobile station according to an embodiment of the present invention.

FIG. 3 is a schematic diagram showing MBMS data transmitted through the access gateway (aGW, access GateWay) 1, wireless base stations (eNB, enhanced Node B) 2-1, 2-2, and the wireless mobile station (UE, User Equipment) 3 according to an embodiment of the present invention. In the example shown in FIG. 3, when the access gateway 1 receives MEMS data (upper MBMS data) from the upper layer apparatus 4 (as shown in FIG. 1), the access gateway 1 copies the MEMS data (in a number corresponding to the number of wireless base stations to receive the MEMS data) and transfers the MBMS data to the wireless base stations 2-1, 2-2 (message distribution). More specifically, the access gateway 1 adds a header indicative of data transmission time to the MBMS data and transmits the MBMS data in the form of lower MBMS data to the wireless base stations 2-1, 2-2. Then, the wireless base stations 2-1, 2-2, after removing the header from the MBMS data, transmit the MBMS data to the wireless mobile station 3 at the timing indicated in the header (i.e. designated data transmission time). Accordingly, the MBMS data S1 transmitted from the wireless base station 2-1 and the MBMS data transmitted from the wireless base station 2-2 can be transmitted at the same time with packet data P1, P2, P3, ... in the same order. The wireless mobile station 3 can receive MBMS data from plural wireless base stations 2-1, 2-2 at delayed transmission timings (delay time difference). For example, the wireless mobile station 3 may receive the MBMS data including delayed waves by using rake combination.

Figure 4:
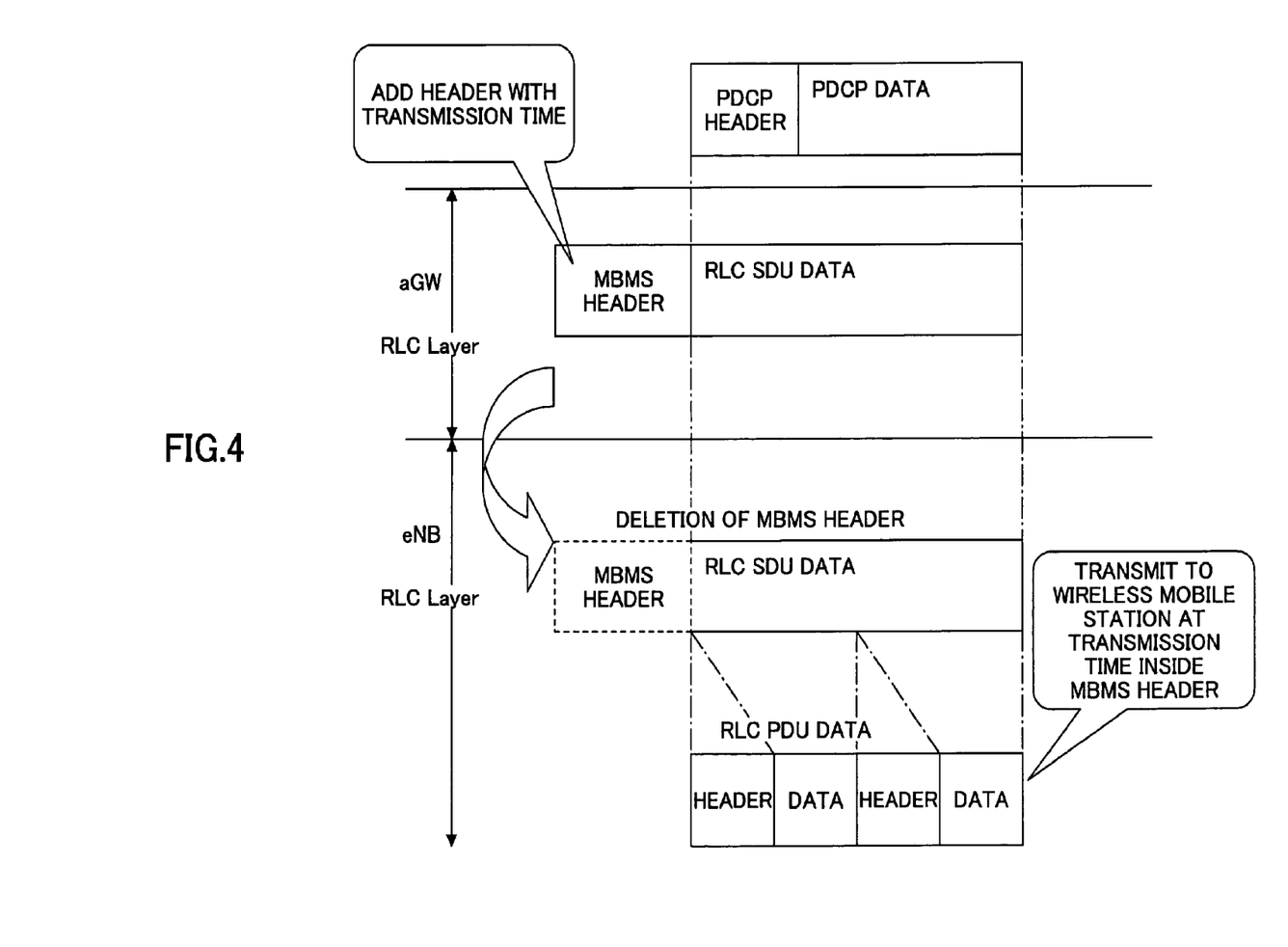
FIG. 4 is a schematic diagram for describing a header during an operation of transmitting MBMS data according to an embodiment of the present invention.

FIG. 4 is a schematic diagram for describing a header during an operation of transmitting MBMS data. When the access gateway (aGW) 1 receives PDCP (Packet Data Convergence Protocol) data having a PDCP header from the upper layer apparatus 4, the access gateway 1 processes (converts) the PDCP data to RLC data (Radio Link Control Service Data Unit), adds an MBMS header set with data transmission time to the RLC data, and transmits the RLC data having the MBMS header to each wireless base station 2. Then, each wireless base station 2 deletes the MEMS header from the RLC data, converts the RLC SDU data to RLC PDU data, divides the RLC PDU data into units of wireless transmission data packets (each packet having a header including, for example, destination address data) P1, P2, P3, and transmits the packets at a time complying with the designated data transmission time indicated in the MBMS header.

Figure 5:
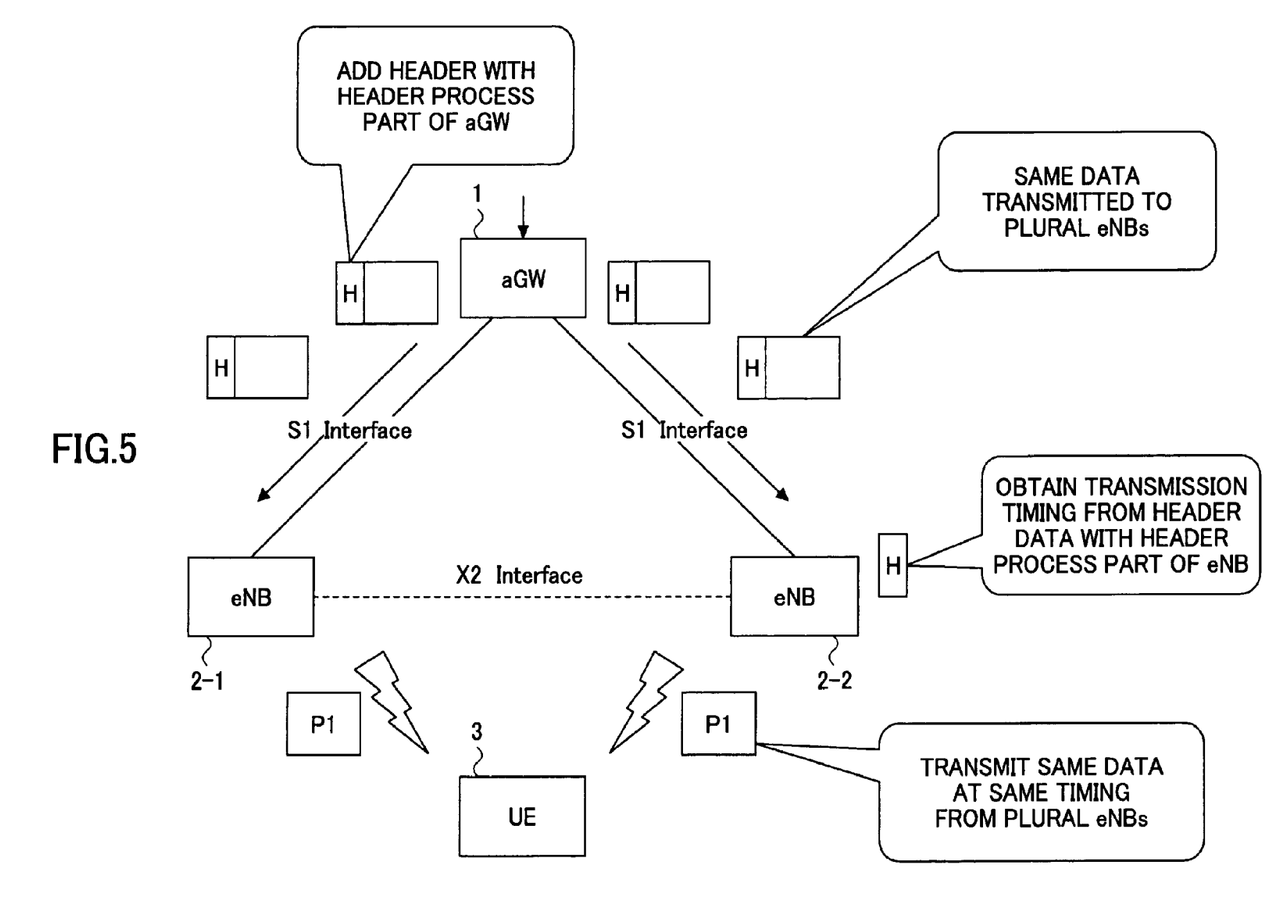
FIG. 5 is a schematic diagram showing a mobile wireless communication system during a MBMS data transmission operation according to an embodiment of the present invention.

FIG. 5 is a schematic diagram showing a mobile wireless communication system 100 during a MBMS data transmission operation according to an embodiment of the present invention. The mobile wireless communication system 100 shown in FIG. 5 includes the access gateway (aGW) 1, wireless base stations (eNB) 2-1, 2-2, and the wireless mobile station (UE) 3. In FIG. 5, "S1 Interface" indicates an interface between the access gateway 1 and the wireless base stations 2-1, 2-2 and "X2 Interface" indicates an interface between wireless base stations 2-1 and 2-2. The header process part 17 (see FIG. 1A) of the access gateway 1 generates a header H set with data transmission data and transfers MBMS data added to the header H to the wireless base stations 2-1, 2-2 via the S1 Interface. The header process parts 28 (see FIG. 2) of the wireless base stations 2-1, 2-2 obtain the timing for transmitting the MBMS data to the wireless mobile station by extracting the data transmission time data from the header H, delete the header H from the MBMS data, and transmit the MBMS data to the wireless mobile station 3. The MBMS data are transmitted from each wireless base station 2-1, 2-1 at the same timing (for example, transmitted as packet data P1 in FIG. 3).

Figure 6:
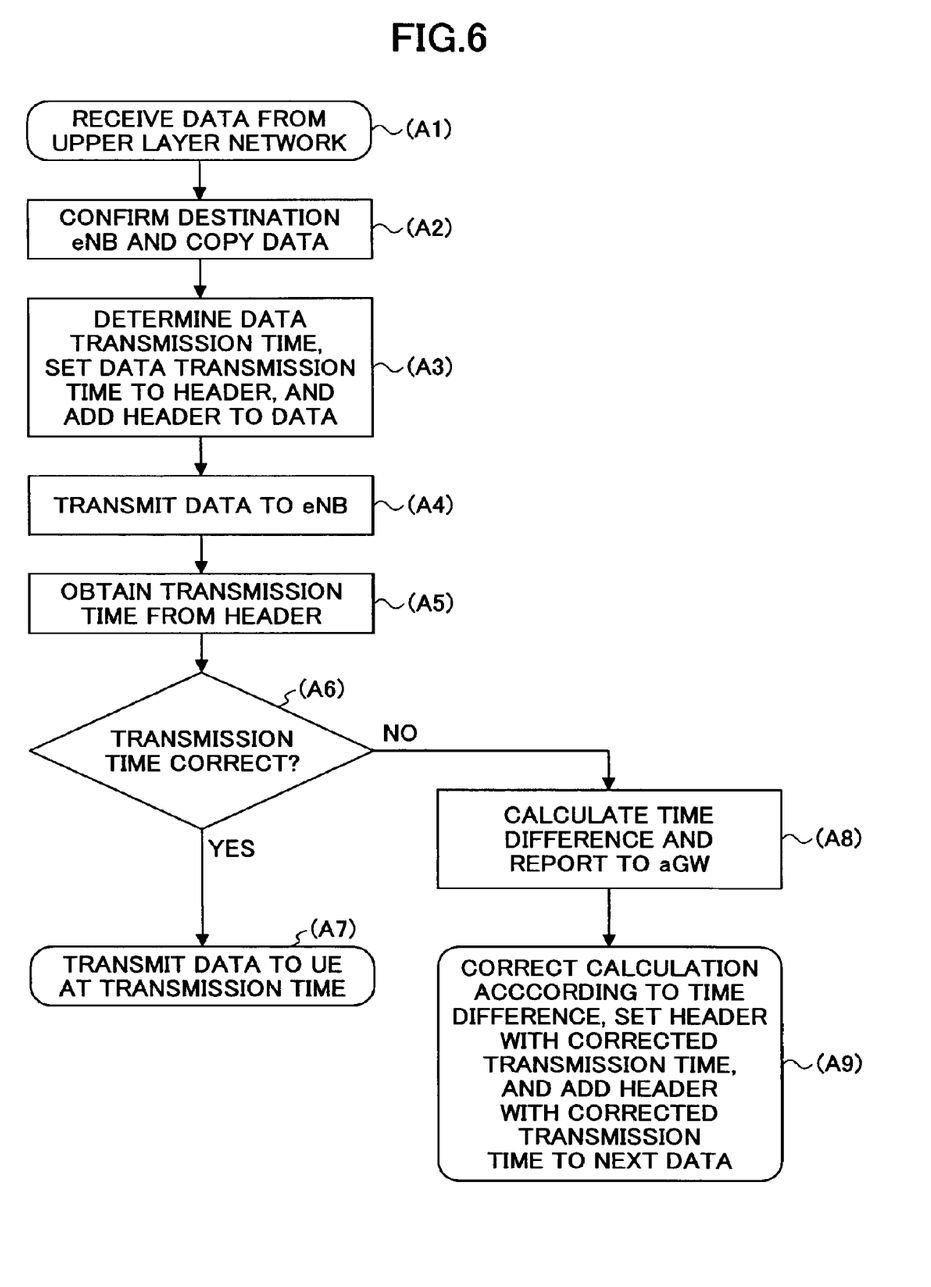
FIG. 6 is a flowchart showing a mobile wireless communication control method according to an embodiment of the present invention.

FIG. 6 shows a flowchart of a mobile wireless communication control method (Steps (A1)-(A9)) according to an embodiment of the present invention. When the access gateway (aGW) 1 receives data (MEMS data) from an upper layer network (corresponding to the upper layer apparatus 4 in FIG. 1) (Step A1), the access gateway 1 confirms the destination wireless base station (eNB) 2 indicated in the MBMS data and makes copies of the MBMS data in a number corresponding to the number of the destination wireless base stations 2 (Step A2). Then, the access gateway 1 determines the time for the data to be transmitted from the wireless base station(s) 2 to the wireless mobile station(s) 3 and adds a header set with data indicative of the data transmission time (transmission time data) to the MBMS data (Step A3). The transmission time data may be, for example, the transmission time data indicated in units of μsec., count value data indicating the count value of a counter for controlling the transmission timing between the access gateway 1, the wireless base station 2, and the wireless mobile station 3, or another counter data value indicating a count value indicating a difference value with respect to a reference value. Then, the access gateway 1 transmits the MBMS data to the wireless base station (eNB) 1 (Step A4).

The wireless base station eNB obtains transmission time data included in the header added to the MBMS data (Step A5) and determines whether the transmission time indicated in the transmission time data is correct (Step A6). This may be determined based on whether the transmission time indicates an upcoming time with respect to the current time indicated in the time data of the wireless base station 2. In other words, the wireless base station 2 determines that the transmission time is correct when the time of receiving data from the access gateway 1 (reception time) is chronologically before the transmission time designated in the transmission time data. Alternatively or additionally, this may be determined based on whether the transmission time indicates a time within a maximum data maintaining time (maximum amount of time for maintaining data) of the wireless base station 2. In other words, the wireless base station 2 determines that the transmission time is correct when the time difference between the reception time and the transmission time designated in the transmission data is shorter than the maximum data maintaining time of the wireless base station 2. Other than those cases, the wireless base station 2 determines that the transmission time is incorrect. When the wireless base station 2 determines that the transmission time is correct, the wireless base station 2 transmits the MEMS data to the wireless mobile station (UE) 3 at the designated transmission time (Step A7).

In a case where the wireless base station 2 determines that the transmission time is incorrect, the wireless base station deletes the transmission time data set to the header and calculates the difference of transmission time so as to attain an affirmative determination (correct transmission time) and reports the calculated time difference to the access gateway 1 (Step A8). The access gateway 1 corrects its formula (expression) for calculating transmission time based on the time difference of the transmission time reported from the wireless base station 2, sets a header with a corrected transmission time, and adds the header to the next MBMS data to be transmitted (Step A9). By generating a simple header in the access gateway 1 and adding the header to the MEMS data, the MEMS data can be transmitted to plural wireless base stations 2 at the same time as the wireless mobile station 3.

Further, the present invention is not limited to these embodiments, but variations and modifications may be made without departing from the scope of the present invention.

The present application is based on Japanese Priority Application No. 2006-275259 filed on Oct. 6, 2006, with the Japanese Patent Office, the entire contents of which are hereby incorporated by reference.

The invention claimed is:

1. A wireless mobile communication system for transmitting MBMS data from an access gateway to a plurality of wireless base stations and transmitting the MBMS data from the plural wireless base stations to a plurality of wireless mobile stations at the same time, the system comprising:

a transferring part included in the access gateway and configured to add a header, being set with data transmission time indicative of the time of transmitting the MBMS data to the plural wireless mobile stations, to the MBMS data, and transferring the MBMS data to the plural wireless base stations;

a transmitting part included in each of the plural wireless base stations and configured to extract the data transmission time from the header of the transferred MBMS data and determine whether the data transmission time is correct, wherein the transmitting part deletes the header from the MBMS data and transmits the MBMS data to the plural wireless mobile stations when the data transmission time is correct; and a receiving part included in each of the plural wireless mobile stations and configured to receive the MBMS data having the header removed therefrom and combine the MBMS data transmitted from the plural wireless base stations;

wherein when the data transmission time is incorrect, the transferring part is configured to transfer the MBMS data added with another header including a corrected data transmission time, the MBMS data being transmitted in accordance with the corrected data transmission time included in the another header.

\* \* \* \* \*